US005777879A

United States Patent [19]

Sommerfeldt

[11] Patent Number: 5,777,879

[45] Date of Patent: Jul. 7, 1998

[54] PROCESS-TO-MARK CONTROL SYSTEM

[75] Inventor: Frank A. Sommerfeldt, New Richmond, Wis.

[73] Assignee: Minnesota Mining and Manufacturing Company, St. Paul, Minn.

[21] Appl. No.: 523,471

[22] Filed: Sep. 5, 1995

[51] Int. Cl.[6] .......... G06F 19/00

[52] U.S. Cl. .......... 364/469.04; 83/74; 83/3.71; 226/27; 364/474.09; 493/11

[58] Field of Search .......... 364/469.03, 469.04, 364/474.09, 561; 83/74, 76.4, 365, 367, 371; 226/2, 9, 27–31; 493/1, 2, 11, 22, 24, 25, 29, 34

[56] References Cited

U.S. PATENT DOCUMENTS

| | | | |
|---|---|---|---|
| 3,626,457 | 12/1971 | Duerr | 83/74 |
| 3,668,957 | 6/1972 | Nido | 83/37 |
| 3,730,810 | 5/1973 | Klein | 156/353 |
| 3,774,016 | 11/1973 | Sterns et al. | 364/469.04 X |
| 3,807,261 | 4/1974 | Couvreur | 83/6 |
| 3,858,052 | 12/1974 | Luska | 250/548 |
| 4,020,406 | 4/1977 | Tokuno et al. | 318/600 |
| 4,044,639 | 8/1977 | Kato | 83/7 |
| 4,170,155 | 10/1979 | Saito et al. | 83/76 |
| 4,221,143 | 9/1980 | Ritter et al. | 83/37 |
| 4,287,797 | 9/1981 | Seragnoli | 83/74 |
| 4,380,943 | 4/1983 | Evans | 83/38 |
| 4,387,614 | 6/1983 | Evans | 83/38 |
| 4,426,898 | 1/1984 | Friberg | 364/469.04 X |
| 4,543,863 | 10/1985 | Radar | 83/76 |
| 4,594,923 | 6/1986 | Fujita | 83/74 |
| 4,697,485 | 10/1987 | Raney | 83/34 |
| 4,737,904 | 4/1988 | Ominato | 364/167 |
| 4,753,379 | 6/1988 | Blasberg et al. | 226/24 |
| 4,768,410 | 9/1988 | Wood | 83/63 |
| 4,781,090 | 11/1988 | Feldkamper et al. | 83/74 |
| 4,781,317 | 11/1988 | Ditto | 226/27 |
| 4,820,251 | 4/1989 | Blaser | 493/1 |
| 4,874,157 | 10/1989 | Jung et al. | 270/30 |
| 4,949,607 | 8/1990 | Yuito | 83/76.7 |
| 4,955,265 | 9/1990 | Nakagawa et al. | 83/74 |
| 4,972,743 | 11/1990 | Nojima | 83/76.8 |
| 4,994,975 | 2/1991 | Minschart | 364/469.04 |
| 5,000,725 | 3/1991 | Bauknecht | 493/11 |
| 5,042,339 | 8/1991 | Gerber | 83/49 |
| 5,063,801 | 11/1991 | Wallis | 83/37 |
| 5,083,487 | 1/1992 | Croteau | 83/29 |
| 5,241,483 | 8/1993 | Porret et al. | 364/469.04 |
| 5,241,884 | 9/1993 | Smithe et al. | 83/76 |
| 5,421,802 | 6/1995 | Landeck et al. | 493/22 |

FOREIGN PATENT DOCUMENTS

| | | | |
|---|---|---|---|
| 2 088 100 | 6/1982 | United Kingdom | B65H 25/24 |

OTHER PUBLICATIONS

Brochure entitled "3M Scotchlite™ Graphic Registration System Operating Manual"; Jun. 1995.

*Primary Examiner*—Joseph Ruggiero

*Attorney, Agent, or Firm*—Gary L. Griswold; Walter N. Kirn; Peter L. Olson

[57] ABSTRACT

A processing control system in a processing apparatus, for repetitive processing of a plurality of marked sections of uniform length forming a continuous elongate material, the processing controller outputting a corrected material feed length signal for maintaining registration between marks on the sections and processing positions on the sections within a tolerance.

17 Claims, 3 Drawing Sheets

PROCESS-TO-MARK CONTROL SYSTEM

BACKGROUND OF THE INVENTION

The present invention relates to a control system for a processing apparatus with which a continuous length of material comprising a plurality of similar sections is repetitively processed on a section-by-section basis.

U.S. Pat. No. 4,737,904 describes a standard length positioning apparatus for use with a cut-to-length apparatus. A mechanism for feeding a web of material is controlled by a digital positioning mechanism according to position feedback. A sensor reads marks on the web of material only during deceleration of the web feeding mechanism immediately before the cut position and the digital positioning mechanism outputs a signal for stopping the driving mechanism when it receives the read-in output of the sensor. If the sensor fails to read a mark during deceleration the drive is stopped. The apparatus requires the sensor to be in a specific spatial relationship to the cutting device. If either the cut length of the material or the position of the marker on the plate is changed it is necessary to change the position of the sensor. Further, the adaptation of the apparatus to a continuous cutter such as a rotary cutter is not described.

U.S. Pat. No. 4,781,090 describes an apparatus for severing sections from a web by transverse severing cuts at locations related to printed marks on the web. The apparatus includes a rotary cutter and a pair of feed rollers. A servomotor is provided to correct the feed mechanism. A mark detector for detecting the printed marks, a sensor for detection the position of the rotary cutter, and a controller are provided. The servomotor changes the feed in accordance with the difference between the theoretical length of each web section and the actual distance between two printed marks. Provided a high quality servomotor is used, this apparatus may be capable of slavishly following the mark-to-mark distances.

U.S. Pat. No. 5,241,884 describes an apparatus for cutting a web which includes a rotary cutter, a first sensor for sensing the rotational position of the cutter, a second sensor for detecting marks on the web, a servomotor driven web feed mechanism and a controller. The controller compares the signals from the two sensors to determine if the marks are in phase with the cutter. Should a deviation be detected, the controller outputs a correction signal to the servomotor. The apparatus slavishly follows any change in the mark-to-mark distances.

U.S. Pat. No. 4,287,797 describes a device for cutting a continuous web which includes a feeding mechanism for the web, a cutter and a detector for marks on the web. A device is provided for checking any deviation between the predetermined zones on the web and the cutter and for correcting any deviation. The apparatus slavishly follows the marks on the web.

U.S. Pat. No. 5,421,802 describes a high speed registration system for the manufacture of plastic bags. The system includes a device for determining the center of each bag from the detected shape of the bag and averages a plurality of center line determinations to generate a "floating" center line for each bag. The downstream sizing apparatus cuts the bag from the web about the floating center line.

In the majority of the known cut-to-length devices mentioned above, the control is such as to slavishly follow the marks on the web. This results in the cut lengths of the sheet varying as widely as the variations in the marks. Thus, further processing equipment for the cut sheets must also be able to accommodate these length changes. This imposes on downstream equipment that it must have the same excellence of control as is provided in the cutting apparatus. Further, the subsequent processes may involve fitting of the cut sheets to another fixture which also has an acceptance tolerance on the length of the cut sheets so that it may be necessary to reduce the variation in cut lengths compared to the variations in mark-to-mark distances.

Any difference between a mark-to-mark distance on a sheet and the cut length of that sheet will result in a change in registration of the mark with the cut edges of the sheet. If the marks are part of a graphics image, this results in the graphics image being displaced on the cut sheet. It is, however, normally possible to tolerate such displacements by providing areas at the leading edge and trailing edge of the cut sheet which have the same color so that small displacements are hardly noticeable. This is often preferable to large changes in cut sheet lengths.

Accordingly, there has been a need for a control device which adequately deals with the conflict of requirements between the variation in the positions of indications on processed sections of an elongate material and the variation in the lengths of the processed sections.

SUMMARY OF THE INVENTION

The invention provides a processing control system in a processing apparatus having processing means for repetitive processing of a plurality of marked sections of uniform length forming a continuous elongate material fed to the processing means. The processing control means outputs a corrected material feed length signal for determining the feed length for the next section. The correction of the feed length is designed to maintain registration within a tolerance between marks on the sections and positions at which processing of said sections is carried out. The processing control system includes first calculating means for calculating a value of a representative length of at least one processed section of elongate material and for outputting this section representative length value. Second calculating means are provided for calculating a first distance between the mark on the last processed section and either the leading or trailing edge of that section and for outputting a first predetermined constant correction factor if the absolute value of the difference between the first distance and a desired distance between any mark and the corresponding edge exceeds a first predetermined amount. Finally the processing control system determines the new feed length signal for the next section to be processed based on a combination of the outputs of the first and second calculating means.

The representative section length may be an average of the lengths of a number of processed lengths or may be a particular length calculated in accordance with the details set out below.

The present invention also includes a processing control method in a processing apparatus having processing means for repetitive processing of a plurality of marked sections of uniform length forming a continuous elongate material fed to the processing means. The processing control means outputs a corrected material feed length signal for maintaining registration between marks on said sections and processing positions on said sections within a tolerance. The processing control method in accordance with the present invention comprises the following steps:

1. calculating a value of a representative length of at least one processed section of elongate material;

2. calculating a first distance between a reference mark on the last processed section and either the leading or trailing end of that section;

3. determining the absolute difference between the first distance and a desired distance between any mark and the corresponding end; and 4. determining a feed length signal for the next section to be processed based on a combination of the representative length of step 1. and a constant correction factor if the absolute difference determined in step 3. exceeds a first predetermined amount.

Other objects and features of the present invention will be described in detail with reference to the accompanying drawings.

DESCRIPTION OF THE ILLUSTRATIVE EMBODIMENTS

The present invention will be described in the following with reference to a license plate cutting apparatus. The invention is not limited thereto. The control system in accordance with the invention may be used with any processing apparatus, not just a cutter, which carries out a repetitive process which requires registration between marks or indications on a continuous material and the position of the process. Examples of such processes may be blanking out holes in specific places on a web, sequential crimping or stamping of the web material, painting or superimposing a graphics image on sections of the web, and repeated welding operations. Further, the web need not be a flat material. Included within the scope of the present invention would be the control of any repetitive processing of sectioned elongate material such as sectioned wires, cables, ribbons, rods, tapes or strips.

Figure 1:
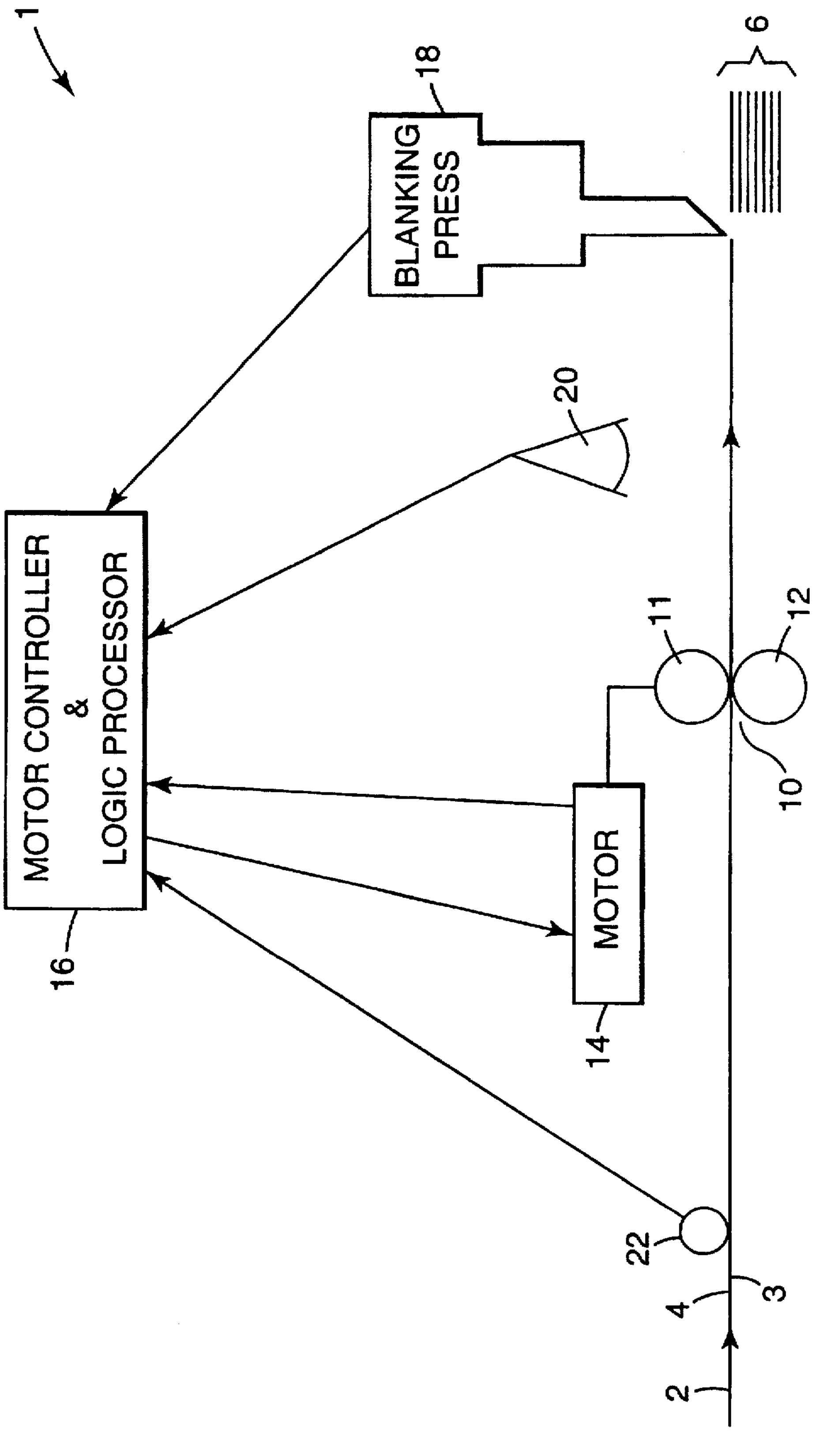
FIG. 1 is a schematic view of a processing line including an embodiment of the processing control system in accordance with the present invention.
Figure 2:
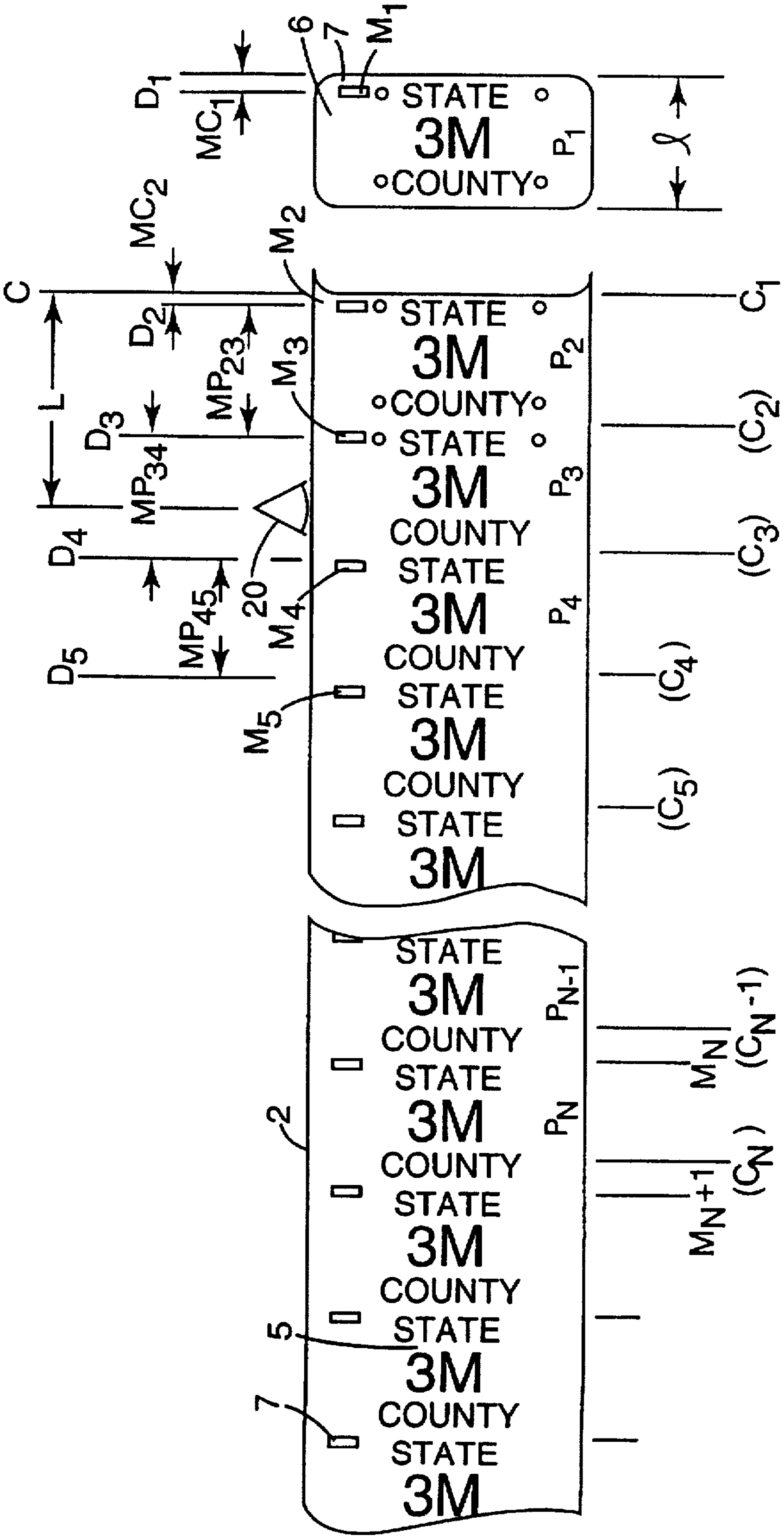
FIG. 2 is a plan view showing elongate material in the position for cutting off the first section.

FIG. 1 shows a high speed license plate cutting apparatus generally indicated as 1. Reference numeral 2 designates a continuous web of material comprising a suitable substrate such as an aluminum or steel sheet 3, laminated with a printed foil 4. The foil 4 is pre-printed with a graphic image 5 such as suitable indications, characters, figures or patterns at regular intervals as best shown in FIG. 2. The pre-printed graphic images 5 are typically arranged with a repetition length l which may be 6.125 inch for instance. Each license plate blank 6 is cut from the web of material 2 with a length l so that the graphic image 5 is registered with each license plate blank 6 to within a pre-determined tolerance.

In FIG. 1 reference 10 designates a feed mechanism which may comprise a pair of upper and lower feed rollers 11, 12 or may be any other feed mechanism suitable for the particular elongate material. The web 2 is clamped between the rollers 11, 12 and is fed forward by them on rotation of the rollers 11.12. The rollers 11, 12 are operatively connected to a motor 14 which may be a servomotor 14 controlled by a servomotor controller and logic processor 16. By means of an encoder (not shown) or similar means, a position signal associated with the output of the servomotor 14 is output from the servomotor to the controller 16 as a position feedback signal. When a pre-determined feed distance is stored in the controller 16 by means of a thumb-wheel or similar means, the servomotor 14 is controlled to feed web material 2 in accordance with a pre-set length determined by the thumb-wheel setting, e.g. the license plate length l. The present invention is not limited to a servomotor. A stepping motor 14 (not shown) or any other suitable feed drive motor may be used as the feed drive motor controlled by a suitable controller and logic processor 16. In the following the servomotor or stepping motor 14 or similar will be referred to generally as "motor 14" and the controller and logic processor generally as "controller 16". It should be understood that the various types of motor can be interchanged with the control system according to the invention.

Reference 18 designates a processing unit, e.g. a cutter, which may be a rotary cutter, which may cut the web continuously, or a punch press, which requires the web to be stopped at each cutting operation, or any suitable cutting device. The cutter 18 outputs a Ready to Feed signal to the controller 16 each time a blank 6 is cut. The reference 20 designates a detector or sensor which detects a mark 7 on each blank 6 on the web 2 and outputs a Mark Read signal to the controller 16. The sensor 20 is located at a convenient position upstream of the cutter 18. The detector or sensor 20 may be any suitable sensor capable of detecting the particular kind of mark 7 on the web 2 such as an "optical eye" which detects a pre-determined part of the graphic image 5 or may be a UV, infra-red, X-ray, proximity, magnetic, temperature sensor or similar. The sensor 20 may also be a pattern recognition system including for example a video camera and data processing device. The sensor may also be a sender/receiver such as a radio frequency sender/receiver capable of receiving a signal from a passive identification device located on each sheet. The mark 7 may be any kind of indication which can be detected by a sensor, e.g. a part of the graphic image 5, a hole or recess in the web material 2, a hot spot, a protrusion or change in reflectance of the surface of the web 2 or the graphic image 5, a section of the web transparent to, or strongly reflecting normal, UV or infra-red light or X-rays, a notch in the edge of the web 2, a portion or portions of magnetic material or a particular smaller graphics image embedded in the main image. Reference 22 designates an encoder which outputs a Web Feed signal to the controller 16 which is proportional to the distance traveled by the web 2. The encoder 22 may be incorporated in the feed mechanism 10. In particular the position feedback signal from a servomotor 14 may be used as the Web Feed signal. In accordance with the present invention, the controller 16 carries out arithmetic calculations based on the Mark Read, Web Feed and Ready to Feed signals to set a corrected feed length lcorr for each plate blank 6 and to output this length to the feed mechanism 10 in the appropriate form.

Figure 3:
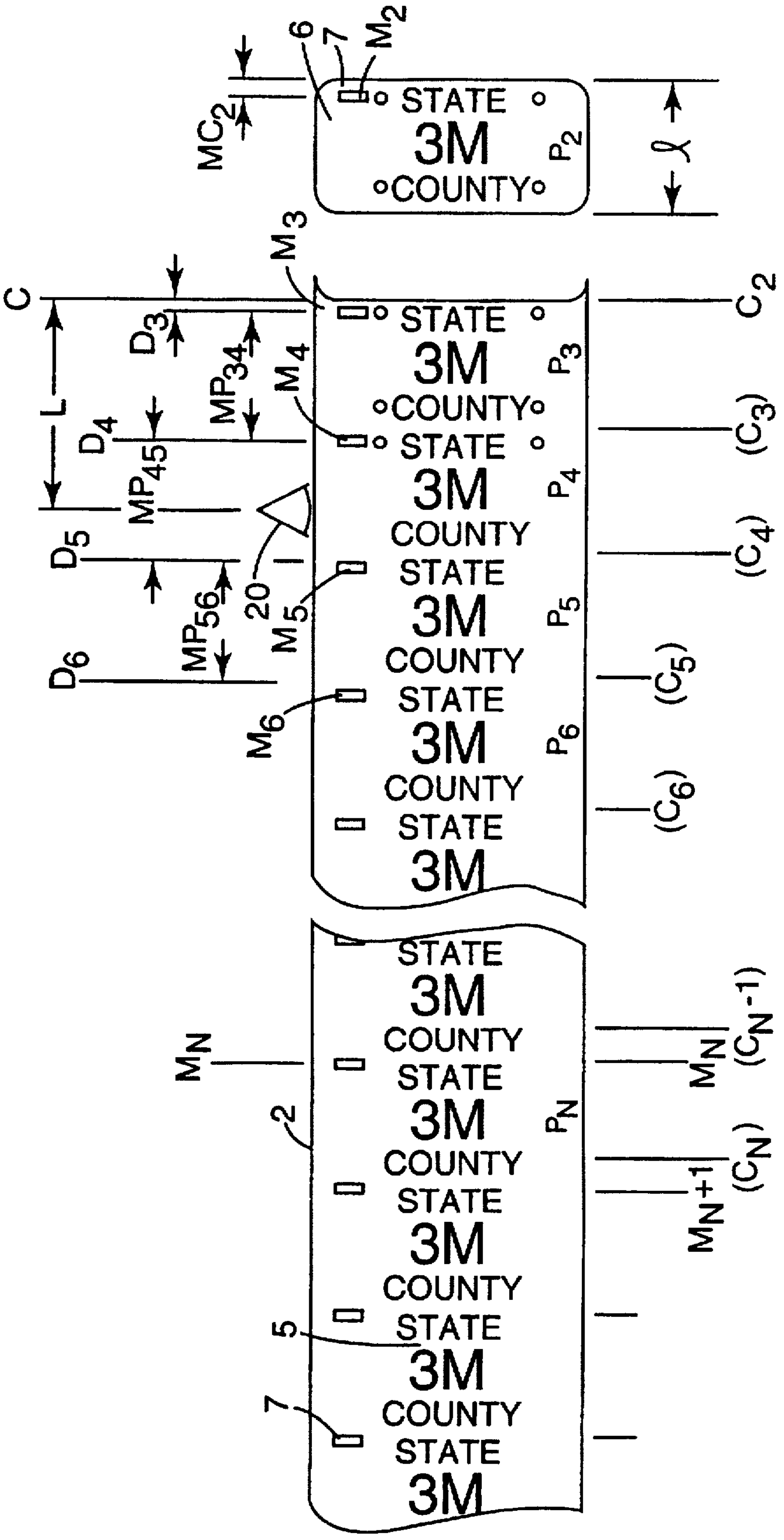
FIG. 3 shows the plan view of FIG. 2 with the elongate material in the position to cut off the third section.

Next the operation and function of the first embodiment of the present invention will be described in detail with reference to FIGS. 2 and 3. The sensor 20 is located at a preset distance L upstream of the cut position C of the cutting blade of the cutter 18. The distance L is stored in the controller 16. For convenience the position of the sensor 20 is shown in FIGS. 2 and 3 as a greater than one plate length and less than two plate lengths but this is not limiting to the invention. The web material 2 is moved forward until the first cut position for the first plate $P_1$ is located at the cut position C of the cutter 18. As the graphic images 5 of the first two plates, $P_1$ and $P_2$ respectively, move underneath the sensor 20, the sensor 20 outputs two Mark Read signals, $M_1$ and $M_2$ respectively which are stored in the controller 16. The values of the encoder 22, $D_1$ and $D_2$ respectively, at the respective output times of the signals $M_1$ and $M_2$ are also stored by the controller 16. The first and second plates $P_1$ and $P_2$ are now cut using the standard feed length l as a default length. During the web feed to cut these two lengths, the signals $M_3$, $M_4$, $D_3$, and $D_4$ (Mark Read signals for the third and fourth sheet and the associated position distances ) are captured. The outputs $C_1$ and $C_2$ of the encoder 22 when the web is in the first cut position (as shown in FIG. 2) and in the second cut position (as shown in FIG. 3), respectively are also stored by the controller 16. During continuous operation, the output of encoder 22 $C_n$ when the nth plate is cut is stored at the time the controller 16 receives the Ready to Feed signal from the cutter 18. The controller 16 next calculates the absolute value of the difference in the stored values $D_2$ and $D_3$ to determine the distance between the marks $M_2$ and $M_3$ (mark-to-mark distance) and stores this value as $MP_{23}$. The controller now calculates the last feed distance as the absolute value of the difference between $C_1$ and $C_2$ and subtracts this last feed length (in this case it is l but for the general case of the nth plate this would be the absolute difference of $C_{n-1}$ and $C_{n-2}$) from $MP_{23}$ and stores this value with its appropriate sign as a first reference value $CB_3$, which will be used for the correction of the feed length for the third plate $P_3$.

The controller 16 next carries out the arithmetic calculation to calculate the distance $MC_2$ from the mark $M_2$ on the second plate $P_2$ to the leading edge of this plate (i.e. the edge furthest from the cutter 18). The distance to the trailing edge may be used as an alternative but the distance to the leading edge is preferred as the cut position of the leading edge is $C_{n-1}$ in general when the nth plate is cut and this value is captured earlier than $C_n$. Thus the calculation may be begun earlier which allows a higher feed rate. The desired distance between the mark 7 and the leading plate edge for this plate design, which has been stored in the controller 16, is subtracted from distance $MC_2$ and the resulting value is stored as a second reference value $RW_3$ which will be used to correct the feed distance of the third plate $P_3$. The controller now outputs a corrected feed length signal $lcorr_3$ to the feed mechanism 10 for bringing the third plate $P_3$ into the cutting position, which is calculated in accordance with the formula:

$$lcorr_3=|C_1-C_2|+RWC_3+CBF_3 \quad (1)$$

where $RWC_3$ and $CBF_3$ are correction factors for the second plate $P_3$ which are determined in the following way:

$RWC_3=\pm\alpha$ if the absolute value of $RW_3$ exceeds a pre-determined tolerance value $T_1$. The sign of $\alpha$ is pre-selected as the same sign as the sign of $RW_3$ and its value is a pre-determined constant, e.g. 0.010 inch. The selection of the sign is such as to bring the mark 7 on the plate closer to the desired position. $RWC_3$ is given the value zero if the absolute value of $RW_3$ is less than $T_1$.

$CBF_3=\pm\beta$ if the absolute value of $CB_3$ exceeds a pre-determined tolerance value $T_2$. The sign of $\beta$ is given the same sign as the sign of $CB_3$ so that if the distance between the marks on the third and second plates is larger than the feed distance of second plate for instance, the feed length is increased by $\beta$ and its value is a pre-determined constant, e.g. 0.010 inch. $CBF_3$ is given the value zero if the absolute value of $CB_3$ is less than $T_2$.

The general formula for the feed length for nth plate is given by:

$$lcorr_n=|C_{n-1}-C_{n-2}|+RWC_n+CBF_n \quad (2)$$

where $RWC_n=\pm\alpha$ if $|Rw_n|>T_1$, where $RW_n=MC_{n-1}$—desired mark to cut leading edge distance. Otherwise $RWC_n$ is given the value zero; and $CBF_n=\pm\beta$ if $|CB_n|>T_2$ , where $CB_n=M_{n-1,n}-|C_{n-1}-C_{n-2}|$. Otherwise $CBF_n$ is given the value zero.

With the above control system the feed length for the nth plate, which is the plate to be processed, is calculated as the actual feed length of the n−1th plate, which is the last plate processed, plus a first correction which increases the feed length by a first constant amount if the distance between the marks of the nth and n−1th plates exceeds the n−1th feed length by a pre-determined amount plus a second correction which moves the mark closer to the desired position on the plate by a second constant amount if the absolute value of the difference in distance between the mark on the n—1th plate and the desired position of that mark on that plate exceeds another predetermined amount.

By using the feed length of the last processed plate as the reference length plus two independent constant correction factors, the change of length between plates can be controlled to prevent the control system from slavishly following every change in length or from hunting. On the other hand the control of plate length change is prevented from causing accumulated offset of the graphic image on the plate by the operation of the second correction factor.

Further, the arithmetic calculations are simple so that processor time in the controller 16 may be so short that the corrections can be made in real time even when the apparatus is run at high speed, e.g. with a rotary cutter.

In a first modification to the first embodiment the value of the last feed length supplied from the controller 16 to the feed mechanism 10 is used instead of the captured last feed length $|C_{n-1}-C_{2n-2}|$ as the basis for the calculation of the new feed length. Thus the feed length for the nth plate would be:

$$lcorr_n=lcorr_{n-1}+RWC_n+CBF_n \quad (3)$$

The value of $lcorr_{n-1}$ is known earlier than $lcorr_n$ so that calculation can be begun earlier.

A second modification of the first embodiment which may be combined with the first modification, is not to wait for the Ready to Feed signal on cutting the last plate 6, but to predict the captured value of $C_{n-1}$ used in the above calculations from $C_{n-2}$ and the calculated feed distance $lcorr_{n-2}$. This does not take into account any overrun or underrun of the feed length compared with the specified feed length but does have the advantage that the calculations can be carried out earlier as it is not necessary to wait for the capture of $C_{n-1}$.

A third modification of the first embodiment which may be combined with the first and/or second modifications, is to use the last two mark positions detected by the sensor 20 to determine the mark-to-mark length. If the sensor is located between f and f+1 integral plate lengths from the cutter 18, i.e. $f \times l<L<(f+1)\times l$, the value for the mark-to-mark distance is then the distance between $M_{n+f}$ and $M_{n+f-1}$ in the above notation which equals $D_{n+f}-D_{n+f-1}$. There are several advantages in using the values of $D_{n+}$and $D_{n+f-1}$ to calculate the mark-to mark distance which is used to calculate $CB_n$. This can most easily be explained by means of a simple example. Let us say that the standard deviation of the mark variations is 0.03 inch and the values of $\alpha$, $\beta$, $T_1$, and $T_2$ are all chosen as 0.01 inch. Statistically there will be occasional mark-to-mark variations of up to 0.09 inch on the large side. It would take 9 feed lengths to reduce this to zero using the correction CBF alone. In practice the reduction is quicker because a) some of the lengths after the large change are small which assist in the reduction and b) the correction factor RWF may operate in addition to CBF as the position of the mark has changed on the plate. The control system working to Equation 2 above waits until the nth plate is being cut before corrections are applied. If however the current values of the mark positions sensed by the sensor 20 at the time that the nth plate is being cut are used, the data for the n+fth and n+f−1 plates are used to correct the feed length for the nth plate. Thus if the value of f is 2 and the large plate is the n+fth plate, then $lcorr_n$ is increased by CBF two cuts in advance of the large plate arriving at the cut position. Thus, using the values captured by the sensor 20 at the time of cutting the n−1th and nth plate (actual captured values=n+f and n+f−1) provides a feedforward control which compliments the feedback control provided by RWF.

A second embodiment of the present invention will be described with respect to FIGS. 1 to 3. In accordance with the second embodiment, the controller 16 according to the first embodiment is modified such that the next feed length, $lcorr_n$, is calculated on the basis of a running average. The remainder of the apparatus is as described above. Accordingly, the general feed length for the nth plate is:

$$lcorr_n=(C_{n-1}-C_{n-s})/s+RWC_n \qquad (4)$$

where s is an integer, typically a value between 3 and 20. The remaining symbols have the same meaning as in the first embodiment.

The advantage of this control system is that the mean feed length is often closer to any particular plate length than the previous feed length. This means that the graphic image may remain dimensionally more stable with respect to the plate than with the system in accordance with the first embodiment. Further, the position of the graphic image may recover more quickly after an abrupt change in the length between graphic images. Disadvantages may be that the improvement in graphic image stability may be obtained only with an increase in plate length changes and the computational time may be increased.

The second embodiment may be modified in that the average of the last s−1 feed lengths lcorr may be taken rather than the average of the captured feed lengths as specified in Equation 4. The feed length for the nth plate would then be:

$$lcorr_n=\Sigma lcorr_x/s+RWC_n \qquad (5)$$

(summation carried out for values of x between n−s and n−1)

In accordance with a third embodiment of the invention the control systems of the first and second embodiments are combined. Thus the feed length for the nth plate is:

$$lcorr_n=(C_{n-1}-C_{n-s})/s-1|+RWC_n+BBF_n \qquad (6)$$

or:

$$lcorr_n=\Sigma lcorr_x/s+RWC_n+BBF_n \qquad (7)$$

(summation carried out for values of x between n−s and n−1) depending on which method of averaging is used. The factor $BBF_n$ in Equations 6 and 7 is calculated as follows. The controller 16 subtracts the average calculated as the first term on the right hand side of one of the Equations 6 and 7 from $M_{n-1,n}$ and stores this value as $BB_n$. If the absolute value of $BB_n$ is greater than the reference value $T_2$, $BBF_n$ takes the value of $\pm\beta$. $BBF_n$ is given the same sign as $BB_n$ in general so that if the graphic image 5 of the nth plate is longer than the average calculated as the first term on the right hand side of one of Equations 6 or 7, the feed length is increased by $\beta$. Otherwise $BBF_n$ is given the value zero.

In the third embodiment the first to third modifications described with reference to the first embodiment may be applied to the third embodiment appropriately.

In accordance with the third embodiment, the advantages of the averaging method of the second embodiment are combined with the feed length control method of the first embodiment. In particular the combination of the third embodiment with the third modification provides a control system with an integrating term, a feedback term and a feed forward term. The control system in accordance with the third embodiment may not necessarily be better than either the first or second embodiment/ depending upon the system requirements. Each system has specific advantages and disadvantages which may be exploited to obtain optimum results in any specific case.

With the first to third embodiments, the selection of the values for $\alpha$, $\beta$, $T_1$ and $T_2$ may depend upon the material processed and the process itself and optimization may require trial and error. It has been found that, as a starting point for further optimization, all of the constants required may be set to between one quarter and one times the root mean square standard deviation of the variations of the mark-to-mark distances.

In the above description of the first to third embodiments a simple blanking line mechanical press cutter has been described. As previously stated the invention is not limited to this type of cutter. For instance, the invention may be applied to a rotary cutter, whereby the controller in accordance with the present invention does not output a new feed length signal to the motor in this case, but rather a signal to change the speed of the feed mechanism so that the appropriate distance may be cut off. The rotary cutter outputs a signal representative of the rotational position of the rotary cutter to the controller to perform this calculation in the known manner.

In the above description of the first to third embodiments of the invention, the Equations 1 to 7 have been given in their algebraic form. The present invention is not limited to the form of the presentation of the technical principles behind the invention. For instance, the realization of these equations for an analogue or digital processor or computer or in a specific computer language may appear very differently from the above equations despite making full use of the invention.

EXAMPLE

A processing line was constructed including a CWP(DDR 128G) mechanical roll feed from Cooper, Weymoth & Peterson Corp. Clinton, Me., U.S.A. driven by a Compumotor Apex 605-MO servomotor with controller Apex 6152 supplied by Compumotor Corp., Rohnert Park, Calif., U.S.A. through a right-angled precision gear box NR 42S-015 supplied by Bayside Gearhead Corp. Port Washington, N.Y., U.S.A., an optical sensor of the type Banner BT 13S with a logic module Banner B4-6 available from Banner Corp. Minneapolis Minn., U.S.A and a Bliss blanking press supplied by Bliss Corp. Hastings, Mich., U.S.A. Aluminum sheet of 0.032 inch thickness and 12.125 inch width laminated with a plastic foil including graphics images repeating at a nominal 6.125 inch was blanked into license plates of a nominal length of 6.125 inch. The standard deviation of the variation of the mark-to-mark distance was 0.019 inch with an average of 6.101 inch. The values of $\alpha$, $\beta$, and $T_1$ and $T_2$ were all set at 0.01 inch. The control system in accordance with the third modification of the first embodiment was used and satisfactory license plate blanks were produced with a maximum variation in plate length of 0.02 inch at a through rate of 100 strokes/minute. No abnormal variation of the graphics image was observed.

Although particular embodiments of the present invention have been illustrated and described, it will be apparent to those skilled in the art that various changes and modifications can made without departing from the spirit of the present invention. It is therefore intended to cover in the appended claims all such changes which fall within the scope of the present invention.

What is claimed is:

1. A processing control system in a processing apparatus having processing means for repetitive processing of a plurality of marked sections of uniform length forming a continuous elongate material fed to the processing means, said processing control means outputting a corrected material feed length signal for maintaining registration between marks on said sections and processing positions on said sections within a tolerance, said processing control system comprising:

first means for calculating a value of a representative length of at least one processed section of elongate material and for outputting said representative section length value;

second means for calculating a first distance between a reference mark on the last processed section and either the leading or trailing end of that section and for outputting a first predetermined constant correction factor if the absolute difference between the first distance and a desired distance between any mark and the corresponding end exceeds a first predetermined amount, and said processing control system determining a feed length signal for the next section to be processed based on a combination of the outputs of the first and second calculating means.

2. A processing control system according to claim 1, wherein said first calculating means calculates the representative length as one of the group consisting of an average of the distances between processing positions of processed sections, a corrected average of the distances between processing positions of processed sections; the corrected length of the last section processed; and the distance corresponding to the feed length signal for the last section processed.

3. A processing control system according to claim 1, wherein said first calculating means calculates a mean value of a plurality of lengths of processed sections of the elongate material and outputs this mean value as the representative section length value.

4. A processing control system according to claim 1, wherein said first calculating mean calculates a section length of the last processed section, calculates a mark-to-mark length along the elongate material between the mark on a section to be processed and the mark on the adjacent section thereto, subtracts the last processed section length from the mark-to-mark length and stores the result as a second distance, adds or subtracts a second constant correction factor to or from the section length of the last processed section, respectively, if the absolute value of the second distance exceeds a second predetermined amount, and outputs the result as the representative section length value.

5. A processing control system in accordance with claim 4, wherein said first calculating means sets the section length of the last processed section to be equal to the length represented by the feed length signal for the last section processed.

6. A processing control system according to claim 1, wherein said first calculating means calculates a mean value of a plurality of lengths of processed sections of the elongate material, calculates a mark-to-mark distance along the elongate material between the mark on a section to be processed and the mark on the adjacent section thereto, subtracts the mean section length value from the mark-to-mark distance and stores the result as a second distance, adds or subtracts a second constant correction factor to or from the section length of the last processed section if the absolute value of the second distance exceeds a second predetermined amount, and outputs the result as the representative section length value.

7. A processing control system according to claim 1, wherein said processing is a cutting operation.

8. A processing control system according to claim 7, wherein said marked sections are license plate blanks.

9. A processing control system in a processing apparatus having processing means for repetitive processing of a plurality of marked sections of uniform length forming a continuous elongate material fed to the processing means, said processing means outputting a first signal on processing each section and said processing control means maintaining registration between marks on said sections within a tolerance, said processing control system comprising:

material feed measuring means for outputting a second signal proportional to a linear movement of said elongate material;

a sensor for reading a mark on each section of said elongate material and for outputting a third signal on each such detection, said sensor being located upstream of said processing means;

feed control means for receiving the first, second, and third output signals from said processing means, said feed measuring means, and said sensor, respectively said feed control means including:

first means for calculating a first value related to a difference in length along the elongate material between the processing position on the next-to-last section processed and the processing position on the last section processed and storing this value, and for calculating a second value related to the absolute value of the difference in length along the elongate material between a mark read on a section to be processed and the mark read on the adjacent section thereto and storing this value;

second means for calculating a third value related to the difference between said first and second values;

first correction means for comparing said third value with a first predetermined reference value and for outputting a first predetermined constant correction factor when the absolute value of said third value exceeds said first predetermined reference value;

third means for calculating a fourth value related to the difference between a calculated actual position of the mark on the last processed section relative to that section and the desired position of the mark on that section;

second correction means for comparing said fourth value with a second predetermined reference value and for outputting a second predetermined constant correction factor when the absolute value of said fourth value exceeds said second predetermined reference value; and means for individually adding, or subtracting the outputs of said first and second correction means to or from said third value, respectively, and for outputting the result for determining a feed distance for the next section to be processed.

10. A processing control system in a processing apparatus having processing means for repetitive processing of a plurality of marked sections of uniform length forming a continuous elongate material fed to the processing means, said processing means outputting a first signal on processing each section and said processing control means maintaining registration between marks on said sections and positions of processing of said sections within a tolerance, said processing control system comprising:

material feed measuring means for outputting a second signal proportional to a linear movement of said elongate material;

a sensor for reading a mark on each section of said elongate material and for outputting a third signal on each such detection, said sensor being located upstream of said processing means;

feed control means for receiving the first, second, and third output signals from said processing means, said feed measuring means, and said sensor, respectively said feed control means including:

first means for calculating a first value related to the average of the differences in lengths along the elongate material between processing positions on a sequence of processed sections and the processing positions on the processed sections adjacent to these processed sections and storing this value;

second means for calculating a second value related to the difference between a calculated actual position of the mark on the last processed section relative to that section and the desired position of the mark on that section;

first correction means for comparing said second value with a predetermined reference value and for outputting a predetermined constant correction factor when the absolute value of said second value exceeds said second predetermined reference value; and means for adding or subtracting the output of said first correction means to or from said second value, and for outputting the result for determining a feed distance for the next section to be processed.

11. A processing control system in a processing apparatus having processing means for repetitive processing of a plurality of marked sections of uniform length forming a continuous elongate material fed to the processing means, said processing means outputting a first signal on processing each section and said processing control means maintaining registration between marks on said sections and positions of processing of said sections within a tolerance, said processing control system comprising:

material feed measuring means for outputting a second signal proportional to a linear movement of said elongate material;

a sensor for reading a mark on each section of said elongate material and for outputting a third signal on each such detection, said sensor being located upstream of said processing means;

feed control means for receiving the first, second, and third output signals from said processing means, said feed measuring means, and said sensor, respectively, said feed control means including:

first means for calculating a first value related to the average of the differences in lengths along the elongate material between processing positions on a sequence of processed sections and the processing positions on the processed sections adjacent to these processed sections and storing this value, and for calculating a second value related to the difference in length along the elongate material between a mark on a section to be processed and a mark on the adjacent section thereto and storing this value;

second means for calculating a third value related to the difference between said first and second values;

first correction means for comparing said third value with a first predetermined reference value and for outputting a predetermined constant correction factor when the absolute value of said third value exceeds said first predetermined reference value;

third means for calculating a fourth value related to the difference between a calculated actual position of the mark on the last processed section relative to that section and the desired position of the mark on that section;

second correction means for comparing said fourth value with a second predetermined reference value and for outputting a second predetermined constant correction factor when the absolute value of said fourth value exceeds said second predetermined reference value; and means for individually adding or subtracting the outputs of the first and second correction means to or from said second value, respectively, and for outputting the result for determining a feed distance for the next section to be processed.

12. A processing control method in a processing apparatus having processing means for repetitive processing of a plurality of marked sections of uniform length forming a continuous elongate material fed to the processing means, said processing control means outputting a corrected material feed length signal for maintaining registration between marks on said sections and processing positions on said sections within a tolerance, said processing control method comprising the following steps:

1. calculating a value of a representative length of at least one processed section of elongate material;
2. calculating a first distance between a reference mark on the last processed section and either the leading or trailing end of that section;
3. determining the absolute difference between the first distance and a desired distance between any mark and the corresponding end; and
4. determining a feed length signal for the next section to be processed based on a combination of the representative length of step 1 and a constant correction factor if the absolute difference determined in step 3 exceeds a first predetermined amount.

13. A processing control method according to claim 12, wherein the step of calculating the representative length includes calculating one of the group consisting of an average of the distances between processing positions of processed sections, a corrected average of the distances between processing positions of processed sections; the corrected length of the last section processed and the distance corresponding to the feed length signal for the last section processed.

14. A processing control method according to claim 12, wherein the step of calculating the representative length includes calculating a mean value of a plurality of lengths of processed sections of the elongate material and outputs this mean value as the representative section length value.

15. A processing control system according to claim 12, wherein the step of calculating the representative length includes calculating a section length of the last processed section, calculating a mark-to-mark length along the elongate material between the mark on a section to be processed and the mark on the adjacent section thereto, subtracting the last processed section length from the mark-to-mark length and storing the result as a second distance, and adding or subtracting a second constant correction factor to or from the section length of the last processed section, respectively, if the absolute value of the second distance exceeds a second predetermined amount.

16. A processing control system in accordance with claim 15, wherein the section length of the last processed section is set to be equal to the length represented by the feed length signal for the last section processed.

17. A processing control method according to claim 12, wherein the step of calculating the representative length includes calculating a mean value of a plurality of lengths of processed sections of the elongate material, calculating a mark-to-mark distance along the elongate material between the mark on a section to be processed and the mark on the adjacent section thereto, subtracting the mean section length value from the mark-to-mark distance and storing the result as a second distance, and adding or subtracting a second constant correction factor to or from the section length of the last processed section if the absolute value of the second distance exceeds a second predetermined amount.

* * * * *